United States Patent [19]

Kumaki et al.

[11] 4,142,763

[45] Mar. 6, 1979

[54] ATTITUDE CONTROL MEANS OF TUNNEL BORING MACHINE SHIELD

[75] Inventors: Yoshihiro Kumaki, Urawa; Junpei Kawade, Ichikawa; Toshiaki Takano, Tokyo; Mitsuo Inoue, Chiba, all of Japan

[73] Assignee: Tekken Construction Co. Ltd., Tokyo, Japan

[21] Appl. No.: 818,334

[22] Filed: Jul. 22, 1977

[51] Int. Cl.² .................... E21D 9/08; E21D 9/10
[52] U.S. Cl. ........................................... 299/1
[58] Field of Search ...................... 175/61; 299/1

[56] References Cited

U.S. PATENT DOCUMENTS

| | | | |
|---|---|---|---|
| 3,482,103 | 12/1969 | Martinsen | 299/1 |
| 3,707,330 | 12/1972 | Pine | 299/1 |
| 3,857,449 | 12/1974 | Kimura | 299/1 |
| 4,027,210 | 5/1977 | Weber | 299/1 |

FOREIGN PATENT DOCUMENTS 1340772 12/1973 United Kingdom .................... 299/1

Primary Examiner—William F. Pate, III
Attorney, Agent, or Firm—Burns, Doane, Swecker & Mathis

[57] ABSTRACT

An improved attitude control system for tunnel boring machine shields is provided. A laser beam transmitter is installed in an already bored tunnel behind the machine shield for transmitting a laser beam in parallel to a predetermined tunneling direction and a device for receiving the beam is installed in the shield for detecting any deviation of the shield from the beam so that, when the deviation is detected during tunneling work performed by rotating a forward end cutter head of the shield and propelling the shield toward tunnel face ground with a plurality of jacks installed at rearward end of the shield, the jacks are selectively driven in response to resultant deviational direction and amount of the detection so as to remove the deviation.

3 Claims, 7 Drawing Figures

ATTITUDE CONTROL MEANS OF TUNNEL BORING MACHINE SHIELD

FIELD OF THE INVENTION

This invention relates generally to shield type tunnel boring machines and, more particularly, to improvements in tunnel boring machine shields specifically of hydraulic type which are equiped with a shield attitude controlling means for performing tunnel boring works accurately in alignment with a predetermined tunneling direction.

BACKGROUND OF THE INVENTION

Generally, in the tunnel boring works employing the shield type machine, a steel made cylindrical shield body of the machine is provided at its forward end with a rotary cutter head and at its rearward end with a plurality of shield propelling jacks disposed respectively at peripheral positions of the rearward end. Thus, while tunnel face ground is being bored by means of the rotary cutter head at the forward end of the shield body, the tunneling machine shield is propelled into the ground by means of the jacks, bored tunnel wall appearing right behind the machine shield as a result of the propulsion thereof is retained with a retaining wall comprising a plurality of segments installed as partly overlapping the rearward end of the shield body and a tunnel is thus made in the ground.

In the tunnel boring works with the machine shield of the kind referred to, it has been desirable to control the attitude of the machine shield so that the shield will keep its accurate orientation in alignment with predetermined tunnel boring direction during the propulsion of the shield so as not to cause any deviation of the shield from the predetermined direction.

In order to achieve the above purpose, it is already known to install a laser beam transmitter in bored tunnel behind the machine shield and to equip the shield body with a beam receiving and detecting device which is fixed inside the shield so that, when the shield body deviates from the predetermined boring direction, the position of incidence of the laser beam on the receiving and detecting device also deviates from an appropriate position of the device, the direction and amount of which deviation is detected by the device to produce a positional output signal depending on such detected deviation. The produced signal is provided to a signal processing device to be processed therein so as to indicate through a servo mechanism the deviational direction and amount. Depending on thus indicated deviational direction and amount, the shield propelling jacks are selectively driven so as to correct the attitude of the shield body for returning it to be in alignment with the predetermined boring direction.

In this case, it is desirable that the shield attitude control is performed within a short time since, unless the control is quickly carried into effect, the deviational amount increases and wavy advancing distance of the shield body between control initiation and completion points has to be prolonged. In particular, the deviation of the shield is apt to occur remarkably rapidly when the ground nature changes, so that it is necessary to provide the laser beam receiving and detecting device in an optimum manner for enabling it to scan an expanded detecting range and to have the deviational direction and amount detected quickly and reliably. In addition, at the same time of detecting any deviations of the shield body in horizontal and vertical directions, that is, those in socalled X and Y axes, it is desired to detect deviations with respect to laser beam axis as a pitching angular deviation and directional angular deviation as well as those with respect to the horizon as a rolling angular deviation, whereby attitude conditions of the shield body under the ground will be always grasped for properly controlling the attitude.

SUMMARY OF THE INVENTION

Primary object of the present invention is to provide a tunneling machine shield equiped with an improved attitude controlling device for reliably precisely detecting any deviational direction and amount of the machine shield from the predetermined tunneling direction to optimumly selectively drive the shield propelling jacks and to thereby effectively correct the attitude of the machine shield so as to be in alignment with the predetermined direction.

Another object of the present invention is to provide an improved tunnel boring machine shield wherein a laser beam receiving and detecting mechanism fixed inside the shield body for a laser beam irradiated from behind the shield body comprises an X-Y scanning type beam receiving and detecting device and/or a gyroscopic type beam receiving and detecting device, so that the deviations along the X and Y axes in the horizontal and vertical directions and/or the pitching and directional angular deviations with respect to the laser beam axis can be detected, whereby a positional detection signal is produced for visually indicating the deviation and a proper and accurate attitude control of the machine shield can be thereby preformed. According to the present invention, it is thus possible to precisely and quickly detect the deviational direction and amount of the machine shield and consequently the attitude control can be performed in a short time and simple manner.

A further object of the present invention is to enable it possible to realize a reliable attitude control of the tunnel boring machine shield with precisely grasped and supervised conditions of the shield under the ground, as well as the above referred deviation detecting operation, by means of a precision gradienter installed in the shield for detecting the rolling angular deviations.

Yet another object of the present invention is to provide a tunnel boring machine shield equiped with a deviation detecting mechanism comprising an X-Y scanning type receiving and detecting device and a gyroscopic type receiving and detecting device for the laser beam in a combination, as well as a means for detecting the rolling angular deviations which is installed within a single housing for the said combination, so that the mechanism can be easily mounted to the machine shield.

A yet further object of the present invention is to provide a tunnel boring machine shield which is adapted to be properly attitude-controlled with a remote control operation by means of a supervising console installed at a position remote from the machine shield under the ground so that an operator of the console can always supervise the attitude conditions of the shield in view of all the X and Y deviations and pitching, directional and rolling angular deviations visually indicated on the console.

BRIEF DESCRIPTION OF DRAWINGS

Other objects and advantages of the present invention shall become clear as the following descriptions of the invention advance as detailed with reference to preferred embodiments of the invention shown in accompanying drawings, in which.

DETAILED DESCRIPTION OF PREFERRED EMBODIMENTS

The present invention shall now be explained with reference to the preferred embodiment shown but it should be understood that the intention is not to limit the invention to the particular embodiment but is to rather include all possible modifications, alterations and equivalent arrangements within the scope of appended claims of the invention.

Figure 1:
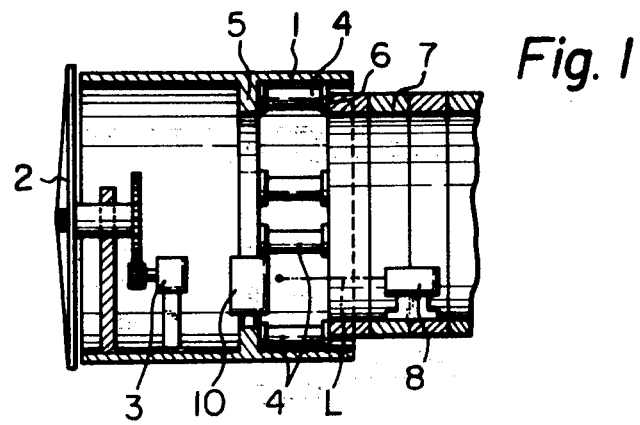
FIG. 1 is a schematic sectioned view of an embodiment of the tunnel boring machine shield of the present invention.

Referring now to FIG. 1, wherein an attitude control mechanism for the tunnel boring machine shield is schematically shown. For the attitude control mechanism itself in which the laser beam transmitter and deviation detecting mechanism are combined, there have been suggested various kinds as seen in, for example, Japanese Patent Publication No. 18471/1871 and so on and detailed explanation of the mechanism appear unnecessary. Referring thereto only briefly here, a substantially cylindrical shield body 1 to be propelled into the tunnel face ground is provided at its forward axial end with a rotary cutter head 2 which is driven to be rotated by a motor 3 and adjacent its rearward end with a plurality of jacks 4 which are fixed at their cylinder ends to an annular flange 5 extruding inward from peripheral wall of the body 1 as spaced from one another along the peripheral wall so as to extend their plungers rearward for propelling the shield body 1. These jacks 4 are positioned between the annular flange 5 of the shield body 1 and a forward end edge 6 of a retaining wall 7 comprising a plurality of segments installed behind the shield body 1 for retaining already bored tunnel wall, and are actuated by means of pressurized oil or the like so that the plungers extruded against the end edge 6 of the retaining wall 7 will propel the shield body 1 toward the tunnel face ground. A laser beam transmitter 8 installed in the retaining wall 7 transmits a laser beam L in parallel to a predetermined tunneling direction toward a deviation detecting mechanism 10 installed in the shield body 1 for receiving the beam L. In the event when the axial line of the shield body 1 deviates from the predetermined tunneling direction, the deviation detecting mechanism 10 detects the direction and amount of the deviation, the shield propelling jacks 4 are selectively driven in response to the detected deviation until the axial line of the shield body 1 will be parallel to the laser beam L and thus the attitude of the shield body 1 is correctively controlled.

Figure 2:
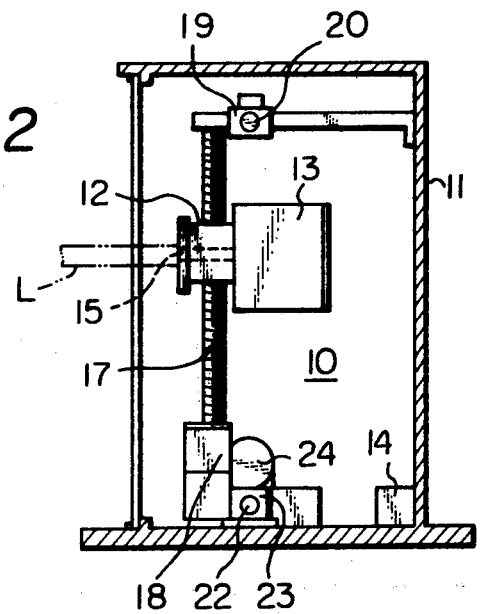
FIG. 2 is a schematic sectioned view showing the interior of a deviation detecting mechanism employed in the machine shield of the present invention.
Figure 4:
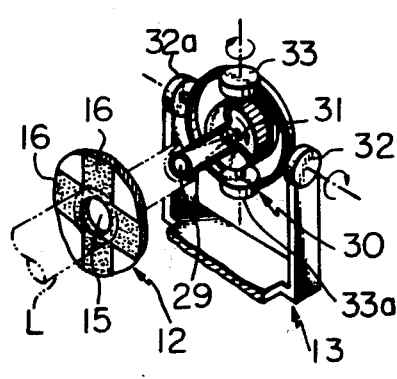
FIG. 4 is a fragmentary perspective view of the laser beam receiving and detecting device in the mechanism of FIG. 2.
Figure 3:
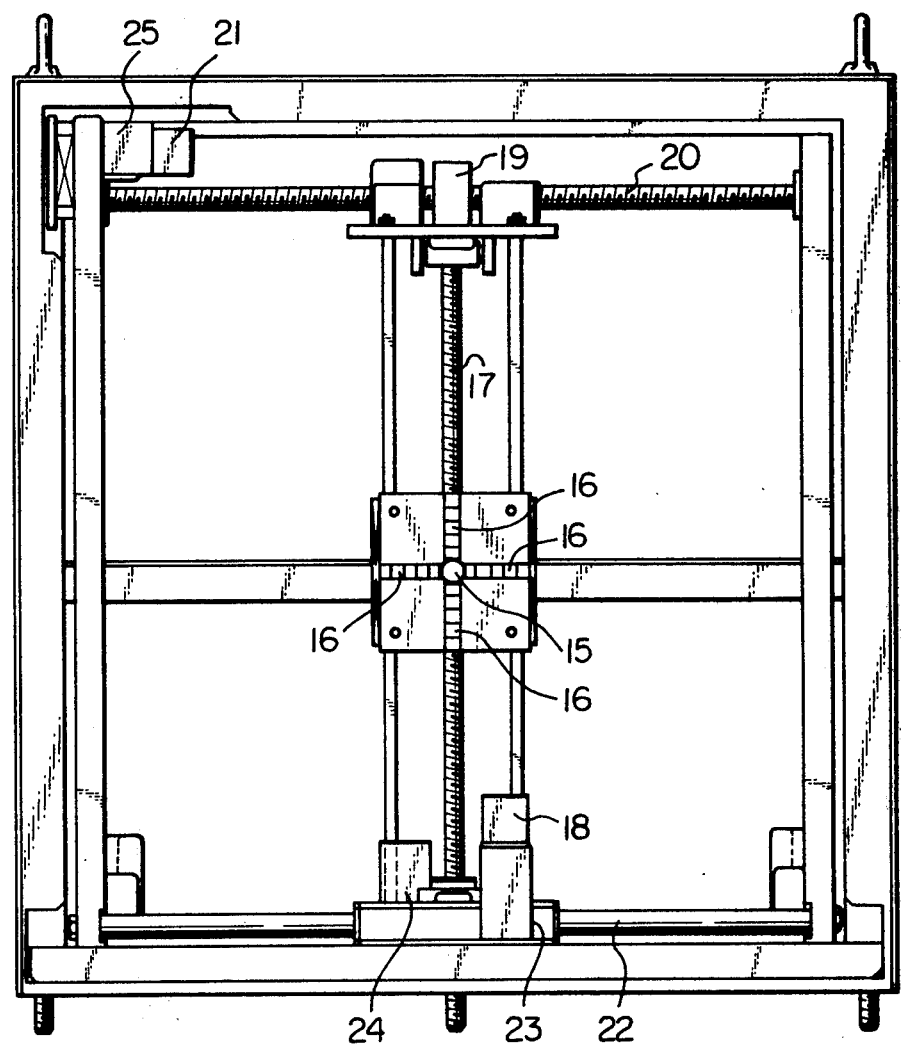
FIG. 3 is a front elevation of the mechanism shown in FIG. 2 in an enlarged scale.

With reference to FIGS. 2 through 4, the deviation detecting mechanism 10 according to the present invention shall be explained in detail. The deviation detecting mechanism 10 is housed in a housing 11 having on the side facing the laser beam transmitter 8 a light-permeable transparent plate. The mechanism 10 comprises, as main components, an X-Y scanning type laser beam receiving and detecting device 12, a gyroscopic type laser beam receiving and detecting device 13 connected to the device 12 on the reverse side with respect to laser beam receiving side thereof, and a precision gradienter 14 as a rolling angular detecting device fixed at a corner of the housing 11. The X-Y scanning type receiving and detecting device 12 has a central aperture 15 for allowing the laser beam L to pass therethrough when the shield body 1 is keeping its correct attitude, and a plurality of silicon photoelectric elements 16 are disposed crosswise along horizontal X-axis and vertical Y-axis with the aperture 15 as the center of the device 12. Further, this X-Y scanning type laser beam receiving and detecting device 12 is screw-fitted to a vertical threaded rod 17 which is rotatable about its longitudinal axis so that, when the rod 17 is rotated by means of a reversible motor 18 through a proper cooperating means, the device 12 will be shifted upward or downward along the rod 17 depending on rotated direction of the rod. This rotatable threaded rod 17 is, further, provided with a coupling member 19 secured to the upper end of the rod, while this coupling member 19 is screw-fitted to a horizontal threaded rod 20 which is rotatable about its longitudinal axis so that, when the rod 20 is thus rotated by means of a further reversible motor 21 through a proper cooperating means, the vertical rod 17 is shifted in horizontal directions along the rod 20 depending on the rotated direction of the horizontal rod 20.

Accordingly, if the X-Y scanning type receiving and detecting device 12 is located at a left-hand upper corner in FIG. 3, the reversible motor 21 is driven to rotate the horizontal rod 20 so as to shift the device 12 until it reaches the other right-hand upper corner, then the other reversible motor 18 is driven to rotate the vertical rod 17 so as to shift the device 12 downward for the length of the device 12 and, thereafter, the reversible motor 21 is again driven to rotate the horizontal rod 20 so as to shift the device 12 until it reaches left-hand end. Repeating such operations, the device 12 can be caused to scann the whole area substantially defined by the respective lengths of the rods 17 and 20 in stepwise manner down to the lower end of the rod 17, so that the laser beam L being incident at any position in the area can be caught and detected by the device 12. In other words, in the case when the beam receiving and detecting device 12 as well as the shield body 1 are out of the laser beam L being irradiated from the transmitter 8 at a fixed position in the already bored tunnel, the X and Y deviations of the shield body 1 can be detected over a remarkably wide detecting range by means of the device 12 caused to scan as shifted vertically and horizontally. The lower end of the vertical rod 17 is coupled to a sliding member 23 which is slidable along a guide rail 22 so as to be firmly supported. Further, the respective rotary threaded rods 17 and 20 are connected with potentiometers 24 and 25 for detecting revolution numbers of these rods, whereby voltage signals corresponding to revolutions of the rods 17 and 20 are produced by the potentiometers 24 and 25 so that the position of the device 12 with respect to the vertical and horizontal directions can be sequentially detected.

Figure 5:
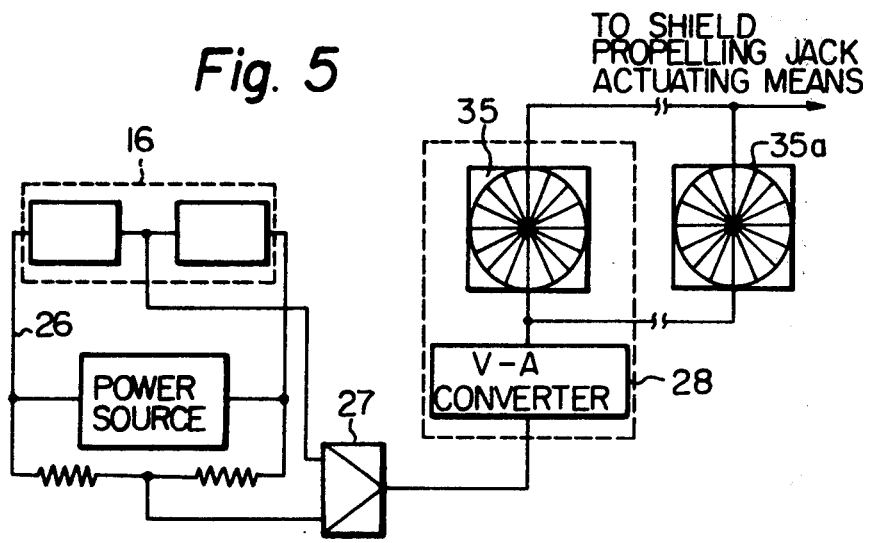
FIG. 5 is a block diagram showing an example of an electric circuit for the deviation detecting employed in the present invention.

The laser beam L is irradiated upon the crosswise silicon photoelectric elements 16 on the beam receiving and detecting device 12. That is, the device 12 is provided with a means comprising these elements 16 for detecting vertical or horizontal deviation of the device 12 from the laser beam L irradiated out of the central aperture 15. As shown in FIG. 5, the photoelectric elements 16 disposed along horizontal X axis passing the central aperture 15 are forming a Whitstone bridge 26 of a pair of variable resistances so that, when the irradiating position of the laser beam L is deviated from the central aperture 15 along the X axis, the Whitstone bridge 26 is unbalanced and a voltage corresponding to such deviation is produced. This voltage denoting the X-axis deviation is amplified by an amplifier 27 and is provided through a voltage-ampere converter 28 to a later detailed X-Y recorder as its X-axis input. There is also provided another Whitstone bridge comprising the photoelectric elements 16 disposed along the vertical Y-axis passing the aperture 15, so that any deviation of the irradiated position of the laser beam L along the Y-axis in the vertical directions may be also detected to provide to the X-Y recorder its Y-axis input.

In another aspect of the present invention, the respective outputs of the above described Whitstone bridges 26 are provided to a servo mechanism so that the reversible motor 18 or 21 of the deviation detecting mechanism 10 will be driven through the servo mechanism so as to rotate the vertical rod 17 or horizontal rod 20. Such rotations of the rods are continued until the central aperture 15 of the beam receiving and detecting device 12 comes into alignment with the laser beam L to fully receive it, while revolution numbers of the respective rods 17 and 20 are detected by the potentiometers 24 and 25 so that detected outputs of these potentiometers will be provided to the X-Y recorder as the both axes inputs.

According to the present invention, the gyroscopic type laser beam receiving and detecting device 13 connected behind the X-Y scanning type device 12 for cooperating therewith is formed so as to receive the laser beam L passed through the central aperture 15 of the device 12 and to detect the pitching angular deviations and directional angular deviations of the shield body from the beam L. This gyroscopic type device 13 includes a lens 29 for converging the laser beam L received and a gyroscope section 30 provided with a central detector 31 which comprises, for example, photoelectric elements forming a circular shape with four sector divisions. Respective centers of these lens 29 and detector 31 are disposed so as to be in alignment with the center of respective rotary axes of the gyroscope. Therefore, the gyroscope section 30 keeps always its normal position irrespective of any deviation of the shield body so that, as long as the shield body involves no deviation, that is, when the laser beam L is being focused at the center of the detector 31, there will be generated no deviation signal. In the event when, however, the laser beam L is focused at a position deviated from the center of the detector 31 on any lateral or vertical side, a deviation signal is generated, which is converted to a signal for properly driving an X-axis torquer 32 or Y-axis torquer 33 which is a kind of induction motor so that the torquer 32 or 33 will be driven by such signal until the laser beam L is focused at the center of the detector 31. At this time, moving amount of the X-axis torquer or Y-axis torquer is taken out of an X-axis pick-off device 32a or Y-axis pick-off device 33a which comprises, for example, a synchronous transformer so as to be utilized as a detecting signal representing the pitching angular and directional angular deviation along the respective X and Y axes.

Figure 6:
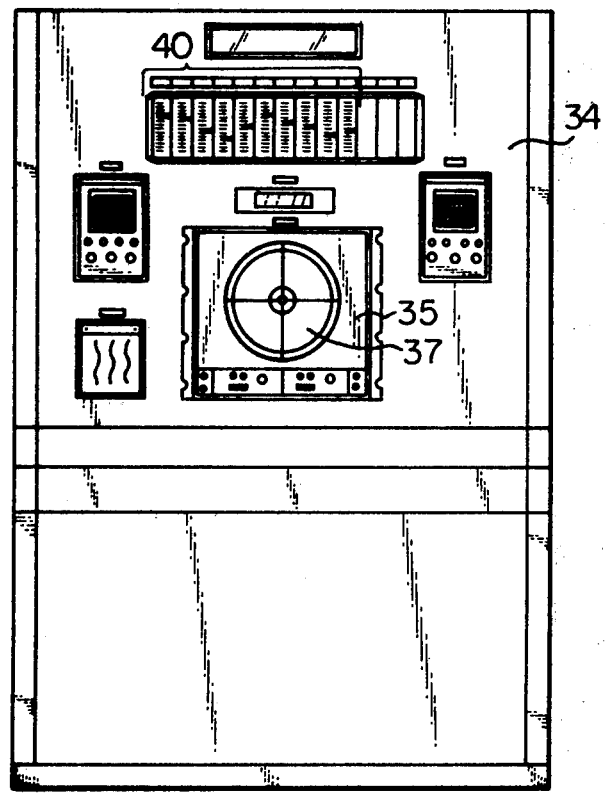
FIG. 6 is an elevation of a remote supervising and controlling console for the attitude of the machine shield of the present invention.
Figure 7:
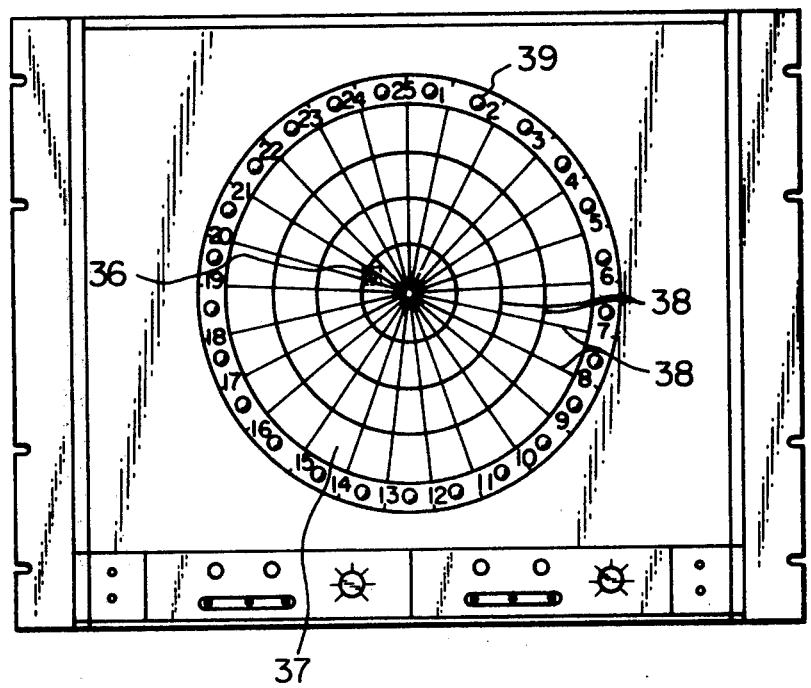
FIG. 7 is a plan view of an indicating unit to be assembled in the console shown in FIG. 6.

According to the present invention, as shown in FIG. 6, the deviations of the shield body 1 in the horizontal and vertical directions detected by the above described X-Y scanning type laser beam receiving and detecting device 12, pitching and directional angular deviations detected by the gyroscopic type receiving and detecting device 13 and rolling angular deviations detected by the precision gradienter 14 are all displayed on the shield attitude supervising console 34. In view of the foregoing descriptions, it should be understood that the deviation signal provided from the X-Y scanning type receiving and detecting device 12 is to be the input signal for an X-Y indicator 35 comprising a high sensitive X-Y recorder. A pointer 36 (see FIG. 7) of the X-Y recorder is driven inside a transparent panel 37 of the console by the X and Y deviation signal inputs, whereby the deviated position of the shield body 1 can be determined from the exterior of the tunnel or on the ground surface. Thus, it should be appreciated that, if the pointer 36 is positioned farther from the center of the transparent panel 37, the deviated amount of the shield body 1 is larger. Further, as shown in FIG. 7, a plurality of radial dividing lines 38 corresponding in number to the shield propelling jacks 4 are drawn on the panel 37, and an indicating lamp 39 is provided in each of regions divided by the radial lines 38 at peripheral part of the region, so that corresponding ones of the lamps 39 to some of the shield propelling jacks 4 selectively driven for correcting the deviation will be lighted to display such jacks being driven. Further, the pitching, directional and rolling angular deviation indicating signals are made to be inputs to another set of indicators 40 on the console 34 so as to be properly indicated by respective pointers. The attitude supervising console 34 may be installed at both positions of inside the shield body 1 and also remote therefrom as shown by a reference 35a in FIG. 5 so as to be well contributive to the remote control operation of the shield body 1.

Depending on the deviated state of the shield body 1, the shield propelling jacks 4 are selectively driven. In this case, it is preferable that selective jack driving commands for optimumly driving the jacks depending on the deviational direction and amount of the shield body 1 are stored in an associated computor. Accordingly, if the arrangement is made in such that the respective deviation indicating signals to be presented to the attitude supervising console 34 are also presented to the associated computor, the respective signals may be operationally processed in the computer so that a proper one of the preliminarily stored selective jack driving commands will be automatically given, whereby the optimum ones of the jacks 4 will be promptly driven so as to remove the deviation of the shield body 1 quickly and reliably. It is thus possible for the operator of the console to accurately grasp any deviated state of the shield body in the light of the respective indications on the console and to selectively optimumly drive the shield propelling jacks partly with manual operations of certain control knobs or the like on the console.

The remote controlling operation of the machine shield can be made easier and even automated so as to render working time under the ground of workers to be the minimum, if the above described attitude supervising console 34 is installed on the ground surface and a computer in which the selective jack driving commands responsive to any deviational directions and amounts are preliminarily stored is cooperatively employed with the tunnel boring machine shield and the console of the present invention.

Referring now to an aspect of a shield deviation detecting method according to the present invention in brief, the laser beam L transmitted from the transmitter 8 first reaches through the transparent plate of the housing 11 the X-Y scanning type laser beam receiving and detecting device 12 in the deviation detecting mechanism 10. In case the beam L passes through the central aperture 15 of the device 12, there is none of the deviation either in the X-axis and Y-axis directions and thus there is generated no deviation signal. Then, the laser beam L passed through the aperture 15 reaches the gyroscopic type laser beam receiving and detecting device 13, wherein as long as the beam L is focused by the lens 29 at the center of the detector 31 there is generated no signal representing the pitching or directional angular deviation. Further, if outputs from the precision gradienter 14 are normal, it is determined that the machine shield body 1 is oriented in the predetermined tunneling direction.

On the other hand, when the irradiated position of the laser beam L deviates from the aperture 15 of the device 12 in the horizontal or vertical direction, the direction and amount of such deviation can be easily discriminated on the X-Y indicator 35 comprising the high sensitive X-Y recorder or the like of the attitude supervising console 34. In the event when the deviated direction of the shield is out of either one of the crosswise arrangements of the silicon photoelectric elements 16 along the X and Y axes of the device 12, or when the deviation is of a large extent even exceeding the range covered by the elements 16 on the device 12, then the scanning operation of the device 12 by means of the vertical and horizontal rods 17 and 20 properly rotated is performed as X-Y controlled until the laser beam L is irradiated on any of the elements 16 along the X or Y axis and then irradiated through the central aperture 15, and the amounts of rotations of the respective rods 17 and 20 are provided as signals so as to be indicated on the indicator 35 as the deviation of the shield in the same manner as in the foregoing.

In the case when, further, the laser beam L is almost in alignment with the aperture 15 but there is involved a deviation of other factor than that along the X or Y axis, the laser beam L passing through the lens 29 does not focus at the center of the detector 31 of the gyroscopic type beam receiving and detecting device 13. Such deviation is, therefore, only detected by means of the detector 31, of which deviation signal drives the X-axis torquer 32 and/or Y-axis torquer 33 until the detector 31 receives the beam L focused at its center, and the moving amount or amounts of the torquer or torquers will be provided by the corresponding X-axis pick-up device and/or Y-axis pick-up device as the deviation signal, which is displayed on the attitude supervising console 34. The rolling angular deviation if any of such deviation as above is also detected by the precision gradienter 14, detected signal of which is also displayed on the console.

In addition, the respective deviation signals thus detected are also provided to the computor to be thereby processed in any known manner so that the shield propelling jacks 4 will be optimumly selected to be driven by the preliminarily stored selective jack driving command corresponding to the deviation direction and amount represented by the signals thus provided to the computor. If, for example, the shield body 1 is provided with 25 pieces of the jacks 4 as represented by 25 regions of the display panel 37 shown in FIG. 7 and the deviation pointer 36 is at the position shown in the drawing, the jacks corresponding to, for example, 6th, 8th to 13th, 15th and 23rd regions of the panel 37 are driven so that the deviation of the shield body 1 will be removed, that is, until the pointer 36 shifts to the center position of the panel 37.

What is claimed is:

1. An attitude controlling system for shield type tunnel boring machine having tunnel boring means at the forward end and a plurality of selectively drivable jacks disposed at the rearward end for propelling the machine toward the forward end, the system comprising in combination means installed in the bored tunnel behind and remote from the machine for transmitting a laser beam toward the machine parallel to a predetermined tunneling direction, a first deviation detecting means installed in the machine for receiving said laser beam and detecting any axial deviation of the machine with respect to the axis of the beam, said first detecting means comprising an X-Y scanning type beam receiving and detecting device having a central aperture and a plurality of photoelectric elements arranged crosswise along horizontal and vertical axes passing through said aperture, said X-Y scanning device being supported for movement along the horizontal X axis and vertical Y axis defining an expanded area for scanning the beam, moving means for moving the device along said X and Y axes until the beam is incident on said photoelectric elements adjacent the central aperture to detect any deviation of the machine along the X and Y axes, and means generating axial deviation signals corresponding to a detected deviation of the machine, a second detecting means carried behind the first detecting means with respect to said laser beam transmitting means for detecting any angular deviation of the machine with respect to the beam axis, said second detecting means comprising a lens converging said laser beam passed through said central aperture of the X-Y scanning device, a gyroscopic detector mounted for rotation relative to said first detecting means about vertical and horizontal axes and having a plurality of photoelectric elements on which said converged laser beam through said lens is focused and generating a deviation signal when the laser beam focused by the lens is out of the center of said photoelectric elements, and means for rotating said gyroscopic detector selectively about its vertical and horizontal axes of rotation relative to said first detecting means in response to said last-named deviation signal until said focused laser beam is incident on the center of the photoelectric elements of said gyroscopic detector, and means for generating angular deviation signals corresponding to rotations of the gyroscopic detector about its vertical and horizontal axes, a third deviation detecting means installed in the machine for detecting any rolling deviation of the machine about its longitudinal axis and generating rolling deviation signals detected, and means responsive to said axial, angular and rolling deviation signals for selectively driving said jacks to correct any of the deviations of the machine.

2. A system according to claim 1, wherein said first and second detecting means are arranged in an integral block housing, said block housing is supported by said moving means, said moving means comprising an elongated vertical rod threaded substantially over its length and rotatable about its longitudinal axis for vertically shifting the block housing, an elongated horizontal rod threaded substantially over its length and rotatable about its longitudinal axis, said horizontal rod being connected to the upper end of said vertical rod for shifting the latter along the horizontal rod, and a horizontal guide rail slidably holding the lower end of the vertical rod, so that the first deviation means will perform the X-Y scanning over an expanded range along X and Y axes defined by said elongated horizontal and vertical rods respectively controllably rotated.

3. A system according to claim 1, wherein said jack driving means comprises means for displaying said axial deviations of the machine with respect to distributions of said plurality of machine propelling jacks over an area of the rearward end of the machine, means for selecting proper ones of the jacks for correcting the deviations of the machine in response to displayed axial deviations, means for displaying said angular and rolling deviations of the machine with respect to zero angular and rolling deviations, and means for determining respective amounts by which respective said proper jacks selected are driven in response to displayed angular and rolling deviations.

* * * * *